United States Patent [19]

Page et al.

[11] Patent Number: 4,968,735

[45] Date of Patent: Nov. 6, 1990

[54] AEROSOL WATER BASED PAINT

[76] Inventors: Edward H. Page, 3940 Ingraham St., San Diego, Calif. 92109; Frank Scotti, 450 Indian Rd., Wayne, N.J. 07470

[21] Appl. No.: 678,256

[22] Filed: Dec. 5, 1984

[51] Int. Cl.$^5$ .............................................. C08J 0/00
[52] U.S. Cl. ........................................ 524/55; 524/378
[58] Field of Search ............................... 524/378, 55

[56] References Cited

U.S. PATENT DOCUMENTS

| | | | |
|---|---|---|---|
| 2,070,167 | 2/1937 | Iddings | 167/13 |
| 2,457,542 | 12/1948 | Golden | 260/8 |
| 2,524,590 | 10/1950 | Boe | 252/305 |
| 2,972,592 | 2/1961 | Brown et al. | 260/27 |
| 3,025,252 | 3/1962 | Jack | 260/23 |
| 3,079,358 | 2/1963 | Uelzmann | 260/29.7 |
| 3,096,001 | 7/1963 | Boe et al. | 222/135 |
| 3,207,386 | 9/1965 | Presant et al. | 222/394 |
| 3,280,050 | 10/1966 | Johnson et al. | 260/17 |
| 3,280,059 | 10/1966 | Giesen | 260/23.7 |
| 3,305,510 | 2/1967 | Gander | 524/378 |
| 3,305,511 | 2/1967 | Gander | 524/378 |
| 3,305,512 | 2/1967 | Gander | 524/378 |
| 3,305,513 | 2/1967 | Gander | 260/33.2 |
| 3,308,078 | 3/1967 | Rogers et al. | 260/27 |
| 3,320,196 | 5/1967 | Rogers | 260/27 |
| 3,328,325 | 6/1967 | Zdanowski | 260/22 |
| 3,328,328 | 6/1967 | Scanley | 260/28.5 |
| 3,343,718 | 9/1967 | Siegel | 222/1 |
| 3,413,254 | 11/1968 | Gander | 260/33.2 |
| 3,419,506 | 12/1968 | Gander | 260/2.5 |
| 3,457,208 | 7/1969 | Sullivan et al. | 260/28.5 |
| 3,467,610 | 9/1969 | Flarman et al. | 260/22 |
| 3,470,054 | 9/1969 | Tyrrell | 156/210 |
| 3,481,889 | 12/1969 | Gibsen | 260/17.4 |
| 3,547,950 | 12/1970 | Gander | 260/33.2 |
| 3,573,239 | 3/1971 | Zdanowski | 260/22 |
| 3,697,466 | 10/1972 | Sullivan et al. | 260/29.6 TA |
| 3,705,669 | 12/1972 | Cox et al. | 222/394 |
| 3,740,366 | 6/1973 | Sanderson et al. | 260/29.6 M |
| 3,808,036 | 4/1974 | Zdanowski | 117/138.8 UA |
| 3,900,438 | 8/1975 | Zdanowski et al. | 260/28.5 R |
| 3,925,282 | 12/1975 | Davis et al. | 260/23 H |
| 3,955,997 | 5/1976 | Sagane et al. | 106/131 |
| 4,001,159 | 1/1977 | Imai et al. | 524/378 |
| 4,014,841 | 3/1977 | Taub | 260/29.6 MN |
| 4,056,500 | 11/1977 | Stern | 260/29.6 MN |
| 4,062,823 | 12/1977 | Cheung et al. | 260/29.4 UA |
| 4,111,881 | 9/1978 | Paul | 524/378 |
| 4,133,790 | 1/1979 | Sekmakas et al. | 260/29.6 NR |
| 4,147,566 | 4/1979 | Leonard | 148/6.15 R |
| 4,154,618 | 5/1979 | Burke | 106/27 |
| 4,187,204 | 2/1980 | Howard | 260/22 CB |
| 4,265,797 | 5/1981 | Suk | 260/29.6 E |
| 4,362,838 | 12/1982 | Leep et al. | 524/444 |
| 4,363,887 | 12/1982 | Leep | 523/482 |
| 4,365,028 | 12/1982 | Leep et al. | 523/402 |
| 4,384,661 | 5/1983 | Page et al. | 222/394 |
| 4,420,575 | 12/1983 | Rapaport et al. | 523/504 |
| 4,432,797 | 2/1984 | Vasishth et al. | 106/34 |
| 4,450,253 | 5/1984 | Suk | 524/378 |
| 4,482,662 | 11/1984 | Rapaport et al. | 523/504 |

FOREIGN PATENT DOCUMENTS

| | | | |
|---|---|---|---|
| 1125142 | 8/1968 | United Kingdom | 524/378 |
| 2028364 | 3/1980 | United Kingdom | |

OTHER PUBLICATIONS

Sciara, *Aerosol Paint Propellants*, Paint and Varnish Production (1963).
Bohnenn, *Dimethylether Pure*, Aerosol Age, p. 26 (Jan. 1981) and p. 42 (Feb. 1981).
B. F. Goodrich-Carbopol Water Soluble Resins.
B. F. Goodrich-Chemical and Industrial Specialties-Carbopol Resins.
Johnson Wax-Joncryl 537 (1982).
Johnson Wax-Joncryl 77 (1979).
Johnson Wax-Joncryl 74F (1984).
Continental Group-Conoweld II (10/84).
Rohm & Haas Company-Acrysol 527.
Rohm & Haas Company-Floor Polishes-Rhoplex B-832 (2/83).
Rohm & Haas Company-Floor Polishes-Rhoplex B505 (8/80).
Rohm & Haas Company-Floor Polishes-Rhoplex B-1604 (4/82).
Rohm & Haas Company-Floor Polishes-Experimental Emulsion E-1821 (4/83).
Rohm & Haas Company-Floor Polishes-Experimental Emulsion E-1876 (4/83).
Rohm & Haas Company-Graphic Arts-Acrysol-ASE-60 (6/78).
Rohm & Haas Company-Industrial Coatings-Acryloid WR-748 (11/83).
Rohm & Haas Company-Industrial Coatings-Acrysol WS-32; Acrysol WS-50 (6/83).
Rohm & Haas Company-Building Products-Acrysol I-62 (5/83).
Rohm & Haas Company-Industrial Coatings-Rhoplex WL-91 (8/83).

(List continued on next page.)

*Primary Examiner*—Joseph L. Schofer
*Assistant Examiner*—J. M. Reddick
*Attorney, Agent, or Firm*—Kenyon & Kenyon

[57] ABSTRACT

This application discloses dimethyl ether propelled water based aerosol compositions. Classes of aqueous thickeners are described herein which are suitable for use in aqueous aerosol coating compositions. The thickeners lose their thickening capability in the presence of dimethyl ether which is the aerosol propellant employed, and thus allows a low enough temporary viscosity to afford suitable flow and breakup when dispensed in spray form from an aerosol dispenser. On evaporation of the dimethyl ether during the spraying process, enough of the dimethyl ether is lost to allow the thickener to regain its thickening capability. High gloss, thick film, aerosol paints can thus be achieved.

19 Claims, No Drawings

OTHER PUBLICATIONS

Rohm & Haas Company-Floor Polishes-Rhoplex WL-91 (9/81).
Rohm & Haas Company-Floor Polishes-Acrysol 644 (2/82).
Rohm & Haas Company-Textile Chemicals-Acrysol ASE Thickeners (11/81).
Rohm & Haas Company-Paper Chemicals-Acrysol Thickeners for Paper Products (12/81).
Rohm & Haas Company-Adhesives-Acrysol Thickeners for Adhesives (3/82).
Rohm & Haas Company-Experimental Thickener E-1615 (1/79).
Rohm & Haas Company-Experimental Emulsion E-1615 in Pigment Printing (10/78).
Rohm & Haas Company-Emulsion E-2014 PMN (5/83).
Rohm & Haas Company-Acrysol ASE-60 (8/74).
Paint-Volume 16 (pp. 742-761).

AEROSOL WATER BASED PAINT

BACKGROUND OF THE INVENTION

Acceptable aerosol dispensed paint compositions must have sufficient mechanical stability to withstand the mechanical shearing forces which aerosol water based paint compositions normally experience as they are dispensed from conventional aerosol containers. Insufficient stability results in mechanical shearing of polymeric components of the composition. Agglomerated bits of the composition can clog the narrow orifices of the aerosol valve outlet and interfere with the even dispersement of paint. Agglomerated bits can also break away from the orifice and be delivered onto the surface of the substrate being painted, thereby marring the paint film thereon.

Mechanical stability of paint formulations has depended in large measure upon maintaining a solution of the polymer in the aerosolized formulation. Proper mechanical stability and low viscosity have been achieved in solvent based systems employing hydrocarbons, alcohols and other solvents. The volatility of the solvent causes rapid thickening of the paint as the aerosolized composition is dispensed and applied to a substrate. The rapid thickening of the aerosol paint during and after it is dispensed is essential to commercial solvent based paint formulations which must be capable of adhering to vertical surfaces without running. That property of a paint composition is referred to herein as vertical cling.

Although organic solvent based systems have been developed which have good mechanical stability and vertical cling properties, the solvents employed in such systems (e.g., hydrocarbons or alcohols) are flammable, toxic and environmentally undesirable. Thus, it was deemed desirable to develop a water based paint composition which would possess the degree of mechanical stability necessary for it to be dispensed with a minimum of breakup from a conventional aerosol valve, while at the same time possessing a high degree of vertical cling when the composition is sprayed onto a vertical substrate.

In light of the environmental hazards associated with aerosol propellants such as the fluorocarbon propellants, it is also important to employ a propellant which is environmentally safe, and possesses a low degree of flammability when used as a propellant for a water based paint concentrate. The propellant dimethyl ether is environmentally safe and also possesses very low flammability in aqueous systems.

It is an object of this invention to provide an aerosol water based paint composition which employs the environmentally safe and acceptable propellant dimethyl ether, while at the same time possessing the key attributes desired in an aerosol dispensed, water based paint, i.e., mechanical stability, the ability to provide a foam-free durable coherent film on the substrate to which the paint is applied, the ability of the composition to cling to vertical surfaces without running, as well as the ability to provide finished paint films having high gloss.

High gloss aerosol paints have been associated with paints having a low pigment solids content requiring the application of relatively thick films in order to completely cover the substrate with the paint film. The application of thick films, however, raises the problem of running when the paint is applied to vertical substrates. Although as discussed below, the aerosol dispenable water based paints of this invention may be formulated to provide a low gloss (or flat) finish, it was a particular objective of this invention to provide an aerosol dispensable paint formulation exhibiting vertical cling thereby permitting the application of thick films, while at the same time imparting a high gloss finish to the substrate Aerosol water based paints are disclosed by the patent literature. See, e.g., Page et al. U.S. Pat. No. 4,384,661, U.S. Pat. No. 4,265,797 and U.S. Pat. No. 4,250,253. However, unlike the dimethyl ether propelled compositions of the prior art, the water based paints of this invention employ a thickening agent as a component of the paint concentrate which loses its ability to thicken in the presence of dimethyl ether, but which rapidly regains its ability to thicken upon volatilization and loss of the propellant from the composition during and after the composition is dispensed. Thus, the aerosol water based paint compositions of this invention advantageously possess a relatively low viscosity prior to being dispensed, while thickening rapidly during and after dispensing. The low viscosity prior to dispensing aids in imparting mechanical stability and valve dispensability to the composition, while the thickening of the concentrate upon loss of dimethyl ether aids in imparting vertical cling to the compositions of this invention.

SUMMARY OF THE INVENTION

Classes of aqueous thickeners are described herein which are suitable for use in aqueous aerosol coating compositions. The thickeners lose their thickening capability in the presence of dimethyl ether which is the aerosol propellant employed, and thus allows a low enough temporary viscosity to afford suitable flow and breakup when dispensed in spray form from an aerosol dispenser. On evaporation of the dimethyl ether during the spraying process, enough of the dimethyl ether is lost to allow the thickener to regain its thickening capability. High gloss, non-running, thick film, aerosol paints can thus be achieved.

DETAILED DESCRIPTION OF THE INVENTION

The water based paint concentrate of this invention includes a film former, water, a thickening agent having the rheology described below, as well as optional ingredients. In embodiments of this invention, the concentrate may be prepared by mixing the thickening agent together with a aqueous emulsion of the film former (e.g., an acrylic latex), or an aqueous solution of a polymeric film former.

A wide variety of polymeric materials may be employed as the film forming component of the concentrate of this invention. For example, film formers suitable for use herein include the alkyds or oil modified alkyds, or acrylic latexes, employing, for example, anionic or nonionic emulsifiers. One example of a commercially available acrylic latex suitable for use herein is WL 91, available from Rohm & Haas Co. That product is an emulsion of a polymer having a molecular weight of about 1,000,000. The film forming polymer in such acrylic latexes may be a water soluble interpolymer of units from at least one neutral free radical polymerizable ester having a vinylidene group attached to the functional group, which ester itself yields a soft linear polymer such as an acrylic, and units from at least one neutral polymerizable aromatic monovinylidene compound which by itself yields a hard polymer especially styrene, and further, units from at least one neutral polymerizable aliphatic monovinylidene compound substituted by a cyano group which itself yields a hard polymer, especially acrylonitrile. Film forming emulsions of the foregoing type are described in U.S. Pat. No. 4,250,575 and U.S. Pat. No. 4,450,253, while methods useful for manufacturing emulsion polymer latexes useful in connection with the manufacture of the aerosol water based paints of this invention are described in U.S. Pat. No. 3,795,564 all of which are incorporated herein by reference.

Among the commercially available acrylic latexes suitable for use herein are Rohm & Haas Product No. B505 which has a 40% solids content, Rohm & Haas Product E1974 which has a 42% solids content and Rohm & Haas AC507 which has a 46% solids content. The particle size of the polymeric component of commercially available acrylic latexes such as E1974 and B505 is below about 10 microns.

The film former may also be an alkyd resin such as those formed by combining polybasic acids or their anhydrides (e.g. phthalic anhydride) with a polyhydric alcohol (e.g. glycerol). Modified alkyd resins such as those formed by substituting acrylic acid for a portion of the polybasic acid are also suitable for use herein.

A wide variety of acrylated oil modified alkyd resins suitable for use herein are commercially available and include, for example, Reliance product WR-4005-BC-70, and Kelsol 3907 available from the Spencer Kellogg division of Textron, Inc. A large number of water reducible oil modified alkyds suitable for use herein are also commercially available, and include, for example, Kelsol 3922, which is available from the Spencer Kellogg division of Textron, Inc.

Solution polymers suitable for use herein are also commercially available and include solutions of acrylic or oil modified acrylic polymers such as product 40-425 from Reichold Inc. (75% solids), WR 748 from Rohm & Haas Co. (60% solids), and WR 98 from Rohm & Haas Co. (70% solids).

In the event that the glass transition temperature (Tg) of the film former selected for use is substantially above room temperature (or the temperature of use of the paint), the Tg of the film former in the concentrate may be adjusted to the desired Tg. Preferably this is accomplished by including ingredients as additives in the concentrate which assist in film formation by lowering the Tg of the film forming polymer to room temperature or to another desired temperature. For example, when latexes or other film formers having a high Tg are employed in the concentrate, a coalescing agent and/or a plasticizer may be included in the concentrate in order to adjust the Tg of the concentrate to the desired temperature, which is preferably below about room temperature Examples of commercially available coalescing agents include the Cellosolves, the Carbitols, and others. The foregoing products are glycol ethers such as ethylene glycol monoalkyl ethers, e.g., ethylene glycol mono butyl ether and ethylene glycol mono alkyl acetates, e.g., ethylene glycol mono methyl ether acetate. Preferably, the coalescing agent will comprise about 0.5% to about 8% by weight of the concentrate.

In accordance with this invention a thickening agent is employed as an ingredient of the concentrate which results in a marked increase in the viscosity of the concentrate, but which loses its ability to thicken the concentrate upon solution of the dimethyl ether propellant in the concentrate. For example, the thickening agent may be employed in an amount which renders the concentrate too viscous to be sprayed by conventional aerosol valve means. However, when the concentrate is placed in an aerosol container and dimethyl ether is added until conventional aerosol propellant pressures are reached in the container, the viscosity of the concentrate is reduced to the sprayable range. In some cases the consistency of the concentrate after addition of the thickening agent may approach that of a gel, but after the solution of propellant amounts of dimethyl ether becomes water-thin and readily sprayable. In preferred embodiments of this invention, the viscosity of the concentrate by addition of thickening agent is adjusted to within the range of about 5,000 to 240,000 cps, and preferably about 10,000 to about 20,000 cps. Most preferably, after the dimethyl ether propellant is dissolved in the concentrate, the concentrate becomes water-thin or at least results in a visually apparent reduction in the viscosity of the concentrate. All viscosities given herein should be understood as referring to viscosities measured at room temperature using a Brookfield RTV, Number 4 or 7 spindle, usually at one rpm or at a speed which provides a measurable reading.

It is believed that the thickeners regain their ability to thicken the concentrate upon dissolution of the dimethyl ether from the thickener containing concentrate, when the composition is sprayed from a conventional aerosol valve and applied to a surface. It is also believed that the reactivation of the thickening agent upon loss of the dimethyl ether from the concentrate results in a rapid increase in the viscosity of the water based paint concentrate while it is being sprayed, which in turn prevents the occurrence of undesirable "running" of the wet paint film when it is sprayed onto a slanted or vertical surface.

The aerosol dispensable compositions of this invention include the water based paint concentrate and an amount of dimethyl ether propellant sufficient to dispense the concentrate from an aerosol dispenser. Desirably, the thickening agent selected for use will be one which loses its ability to thicken the concentrate upon exposure of the concentrate to propellant pressures of dimethyl ether in the aerosol container. For example, the thickener selected for use may be one which loses its ability to thicken the concentrate when about 10 to about 40 parts, preferably about 15 to about 35 parts by weight of dimethyl ether, are dissolved in the concentrate at conventional aerosol container pressures, e.g., at an internal container pressure of about 30 to about 80 psi at about room temperature.

The preferred thickeners having the rheological properties in the presence of dimethyl ether discussed above, are the commercially available acrylic thickeners which lose their ability to thicken the other components of the concentrate in the presence of dimethyl ether.

Among the commercially available acrylic thickeners suitable for use herein are those which are in the form of alkali soluble emulsions of acrylic polymers containing acidic functional groups which are formulated to dissolve or swell when neutralized with base in aqueous systems. Typically, such thickeners are prepared by emulsion polymerization techniques, and, therefore, the polymers are present as dispersed particles in an aqueous emulsion. The acrylic thickeners are employed by adding them to an aqueous system, and then neutralizing the mixture with base to produce a clear viscous solution, or a clear highly swollen dispersion. The acrylic thickeners employed herein preferably have an equivalent of about 72 to at least about 266, and most preferably an equivalent weight of about 218 to about 266. Equivalent weight refers to the weight of polymer solids which will be neutralized by one mole (35 grams) of ammonium hydroxide.

A wide variety of acrylic emulsion thickening agents are commercially available. Among those suitable for use herein are the Carbopol thickeners available from the B.F. Goodrich Co., as well as ASE-60 (28% solids, pH 3.5, cross-linked swellable polymer, equivalent weight 218), Acrysol ASE-75 (40% solids, pH 3.0, not cross-linked alkali soluble polymer, equivalent weight 266), Acrysol ASE-95 (20% solids, pH 3.0, not cross-linked, alkali soluble, equivalent weight 124), Acrysol ASE-108 (20% solids, cross-linked, swellable, pH 3.0, equivalent weight 124), and thickener E-1615 (30% solids, pH 3.0, alkali swellable, equivalent weight 218), all of which are commercially available from Rohm & Haas Co.

The acrylic thickeners are preferably employed in relatively small amounts in the concentrate ranging from about .5% to about 10%, and most preferably about 1.0% to about 3.0% by weight of the concentrate of acrylic thickener solids.

Certain natural or synthetic gums may also be employed as the thickener component of this invention. Of course, the gum or any other type thickener selected for use must be one which loses its capacity to thicken the concentrate upon solution therein of dimethyl ether, but which regains its capacity to thicken upon dissolution of the dimethyl ether as described above. Gums which possess the foregoing rheological properties outlined above include gum tragacanth which is the calcium salt of gluconic acid. Gums similar chemically to gum tragacanth include Algin, Arabic, Ghatti, Irish Moss and Iceland Moss. Carboxymethyl cellulose, as well as methylhydroxypropylcellulose, methylhydroxyethylcellulose, carboxymethylmethylcellulose and methylcellulose have been identified as thickeners which do not lose their ability to thicken in the presence of dimethyl ether, and therefore do not possess the requisite rheological properties outlined above.

The water based paint concentrates of this invention are basically comprised of water, film forming solids uniformly dispersed or dissolved in the water, and a thickener having the rheological properties discussed above. For example, the water based paint concentrate may preferably include, by weight, from about 20% to about 95% water, most preferably about 60% to about 90% water, about 3% to about 40% film forming solids, most preferably about 7% to about 15% film forming solids, and about .5% to about 10% by weight of the thickener, and most preferably about 1% to about 5% thickener by weight of the concentrate. Preferably the total solids content of the concentrate will range from about 5% to about 80%, most preferably from about 10% to about 40% All percentages of ingredients given herein are by weight unless otherwise specified.

A wide variety of optional ingredients may be included in the water based paint concentrate of this invention including, for example, pigments, pH stabilizers, antifoam agents, surfactants, plasticizers (about 0.5% to 5%, preferably about 1% to about 3% by weight of the concentrate) and coalescing agents.

Pigments are an optional component for use in the concentrate of this invention. Preferably, the concentration of the pigment in the concentrate will range from about 0.1% to about 10%, and most preferably from 1% to about 3% of the concentrate. An auxiliary additive such as a surfactant may also be employed to maintain the pigments in a uniformly dispersed state within the concentrate. For example, the surfactant employed as an auxiliary additive or as a dispersant for the pigment may be a nonionic surfactant having an HLB (hydrophile-lipophile balance) of at least about 14, such as those identified in U.S. Pat. No. 4,384,661 which is incorporated herein by reference Such surfactants may be employed in amounts of about 0.5% to about 3% of the concentrate, preferably about 1% to about 3%.

The aerosol water based paints of this invention may be formulated to provide a low, medium or high gloss, durable film on the surface to which it is applied Particularly, high gloss embodiments of the composition of this invention are preferably prepared by employing a film forming polymer in the concentrate having a relatively small particle size, for example, a particle size in the range of less than about 10 microns. It is also preferred to employ a low pigment and film forming solids level when formulating the high gloss embodiments of this invention, e.g., about 0.1% to 5% pigment, and about 3% to 40% film forming solids.

Gloss requires that paint dry with a planar outward surface. Conventional film formers tend to dry in this manner naturally. However, when pigments are added in high concentrations relative to the volume of film forming solids present, the pigment tends to migrate to the film surface, dispersing incident light and reducing gloss. Thus, gloss is best achieved in paint formulations having low concentrations of pigment relative to film former. However, when paints with low pigment concentrations are dispensed from aerosol containers, relatively fast valves capable of dispensing thick films are desired to insure sufficient hiding of the substrate. Advantageously, the water based paints of this invention which may be applied in the form of thick films exhibit excellent vertical cling, while at the same time providing a high gloss finish.

Conventional plasticizers may optionally be employed in the concentrate to enhance the flexibility of the polymer film. In addition, the plasticizer may be employed to adjust the Tg of the composition in the manner described above with respect to the coalescing agent. Any of a wide variety of plasticizers which are compatible with the other ingredients of the concentrate and the dimethyl ether propellant may be employed. Preferred plasticizers include, for example, dibutyl phthalate, and 2,2,4,trimethyl-1,3-pentanediol monoisobutyrate (commercially available as Texanol 2 from Eastman Kodak Co.).

Additives may also be employed in order to insure that the pH of the concentrate or the concentrate plus dissolved propellant is not at a level which might have a corrosive effect on the container. The pH of the concentrate is preferably in the range of about 7 to about 10.5. Suitable pH adjusters include ammonia, amines such as triethanol amine, etc.

As will be appreciated by those familiar with the art of paint formulation, there is a wide variety of minor additives which may be employed in paint formulations in addition to those mentioned above, without departing from the spirit of this invention.

The aerosol dispensable water based paint composition (i.e., the concentrate plus propellant) of this invention is prepared by conventional means. For example, an aerosol container is filled with the concentrate, followed by addition of a propellant amount of dimethyl ether, and then pressurization and sealing of the aerosol container. Preferably, the container is filled to a propellant pressure of 30–80 psig at 70° F., most preferably 35–65 psig at 70° F.

The invention is further illustrated by the following examples. These examples are set forth in illustration of the invention and should not be construed as limitations thereon. There is no intention, in the use of any terms or expressions, of excluding any equivalents of the features described, it being recognized that wide variations are possible within the scope of the claimed invention.

EXAMPLES

Examples 1 through 42 of Table I illustrate various formulations and disclose the viscosity, vertical cling, and aerosol sprayability (using dimethyl ether propellant) of each formulation. An identification of the code names for ingredients set forth in Table I is provided by Table II, while the procedures employed to prepare and test the formulations are set forth following Table II.

Examples 1–3, 5–7, 9–10, 12, 14–15, 17, 19, 21, 24, 26, 28, 30, 36 and 38–40 illustrate the use of a dimethyl ether propelled concentrate which includes a thickener in the formulation of the present invention. Each of these formulations exhibit aerosol sprayability and good vertical cling, except the formulation of Example 7 wherein vertical cling is somewhat insufficient probably due to excessive coalescent concentration.

Examples 4, 11, 13, 16, 18, 20, 22, 27, 29, 31–35, 37, 41 and 42 illustrate the lack of sprayability encountered using a thickener such as carboxymethylcellulose having insufficient viscosity change in the presence of dimethyl ether. Examples 8, 23 and 25 illustrate the lack of vertical cling experienced by formulations to which no thickener has been added.

TABLE I

| Ex. | Resin & % | | Plasticizer & % | | Coalescent & % | | % H₂O | Thickener & % | | * | Viscosity | Sprayability | Vertical Cling |
|---|---|---|---|---|---|---|---|---|---|---|---|---|---|
| 1 | 505 | 20 | DBP | 2 | 0 | — | 75 | 1615 | 3 | Yes | 240 M** | Yes | Yes |
| 2 | 505 | 20 | DBP | 2 | 0 | — | 75 | ASE60 | 3 | Yes | 50 M | Yes | Yes |
| 3 | 505 | 20 | DBP | 2 | 0 | — | 75 | ASE75 | 3 | Yes | 80 M | Yes | Yes |
| 4 | 505 | 20 | DBP | 2 | 0 | — | 77 | 250H | 1 | No | 100 M | No | — |
| 5 | 505 | 20 | DBP | 2 | B. Cell. | 5 | 70 | 1615 | 3 | Yes | 40 M | Yes | Yes |
| 6 | 505 | 20 | DBP | 2 | B. Carb. | 5 | 70 | 1615 | 3 | Yes | 40 M | Yes | Yes |
| 7 | 505 | 20 | DBP | 2 | B. Carb. | 10 | 65 | 1615 | 3 | Yes | 5 M*** | Yes | No |
| 8 | 505 | 20 | DBP | 2 | B. Carb. | 10 | 68 | — | 0 | No | <0.1 M*** | Yes | No |
| 9 | 1974 | 30 | Texanol | 2 | B. Carb. | 2 | 63 | 1615 | 3 | Yes | 140 M | Yes | Yes |
| 10 | 1974 | 20 | Texanol | 2 | B. Carb. | 2 | 73 | 1615 | 3 | Yes | 140 M | Yes | Yes |
| 11 | 1974 | 20 | Texanol | 2 | B. Carb. | 2 | 75 | 250H | 1 | No | 100 M | No | — |
| 12 | WL91 | 20 | DBP | 2 | B. Cell. | 5 | 70 | 1615 | 3 | Yes | 40 M | Yes | Yes |
| 13 | WL91 | 20 | DBP | 2 | B. Cell. | 5 | 72 | 250H | 1 | No | 100 M | No | — |
| 14 | 3907 | 20 | 0 | — | 0 | — | 77 | 1615 | 3 | Yes | 270 M | Yes | Yes |
| 15 | 3907 | 20 | 0 | — | 0 | — | 78 | 1615 | 2 | Yes | 140 M | Yes | Yes |
| 16 | 3907 | 20 | 0 | — | 0 | — | 79 | 250H | 1 | No | 100 M | No | — |
| 17 | AC507 | 15 | 0 | — | 0 | — | 82 | 1615 | 3 | Yes | 240 M** | Yes | Yes |
| 18 | AC507 | 15 | 0 | — | 0 | — | 84 | 250H | 1 | No | 100 M | No | — |
| 19 | 3922 | 15 | 0 | — | 0 | — | 83 | 1615 | 2 | Yes | 140 M | Yes | Yes |
| 20 | 3922 | 15 | 0 | — | 0 | — | 84 | 250H | 1 | No | 100 M | No | — |
| 21 | 40-425 | 20 | 0 | — | 0 | — | 77 | 1615 | 3 | Yes | 40 M | Yes | Yes |
| 22 | 40-425 | 20 | 0 | — | 0 | — | 79 | 250H | 1 | No | 100 M | No | — |
| 23 | 748 | 26 | 0 | | 5 | | 69 | — | 0 | No | <0.1 M*** | Yes | No |
| 24 | 748 | 26 | 0 | | 5 | | 66 | 1615 | 3 | Yes | 20 M | Yes | Yes |
| 25 | 97 | 15 | 0 | | 0 | | 85 | — | 0 | No | <0.1 M*** | Yes | No |
| 26 | 97 | 15 | 0 | | 0 | | 82 | 1615 | 3 | Yes | 60 M | Yes | Yes |
| 27 | 0 | — | 0 | — | 0 | — | 99 | Guar | 1 | C | 13 M*** | No | — |
| 28 | 0 | — | 0 | — | 0 | — | 99.5 | 940 | 0.5 | Yes | 240 M** | Yes | Yes |
| 29 | 0 | — | 0 | — | 0 | — | 99 | locust bean | 1 | No | 200 *** | No | — |
| 30 | 0 | — | 0 | — | 0 | — | 99 | Tragacanth | 1 | Yes | 100 M | Yes | Yes |
| 31 | 0 | — | 0 | — | 0 | — | 99 | CMC | 1 | No | 20 M | No | — |
| 32 | 0 | — | 0 | — | 0 | — | 99 | MHPC | 1 | No | 2 M*** | No | — |
| 33 | 0 | — | 0 | — | 0 | — | 99 | MHEC | 1 | No | 2 M*** | No | — |
| 34 | 0 | — | 0 | — | 0 | — | 99 | CMMC | 1 | No | 2 M*** | No | — |
| 35 | 0 | — | 0 | — | 0 | — | 99 | HPGG | 1 | No | 2 M*** | No | — |
| 36 | 3907 | 17 | Black Daniels | 1 | 0 | — | 81 | 1615 | 1 | Yes | 10 M*** | Yes | Yes |
| 37 | 3907 | 17 | Black Daniels | 1 | 0 | — | 81.5 | CMC | 0.5 | No | 380 *** | No | — |
| 38 | 505 | 30 | Black Daniels | 1 | B. Carb. | 2.5 | 63.5 | 1615 | 3 | Yes | 20 M*** | Yes | Yes |
| 39 | 505 | 30 | White Daniels | 5 | B. Carb. | 2.5 | 59.5 | 1615 | 3 | Yes | 20 M*** | Yes | Yes |
| 40 | 505 | 20 | White Daniels | 5 | M. Carb. | 2.3 | 70.7 | 1615 | 2 | Yes | 20 M*** | Yes | Yes |
| 41 | 3907 | 15 | Black Daniels | 1 | 0 | — | 83.5 | 250H | 0.5 | No | 1 M*** | No | — |
| 42 | 3907 | 15 | Black | 1 | 0 | — | 83.75 | 250H | 0.25 | No | | | |

TABLE I-continued

| Ex. | Resin & % | Plasticizer & % | Coalescent & % | % H$_2$O | Thickener & % | * | Viscosity | Spray-ability | Vertical Cling |
|---|---|---|---|---|---|---|---|---|---|
| | Daniels | | | | | | | | |

* Observable Viscosity Difference when Aerosolized with DME.
** M is 1000, thus a viscosity of 240 M = 240,000 cps.
*** Brookfield RTV #4 spindle, 1 rpm - all others at #7 spindle, 1 rpm.

The following (Table II) is an identification of the code names employed for the ingredients listed in Table I.

TABLE II

| Code | Manufacturer | Solids | Solvent | Polymer Type |
|---|---|---|---|---|
| 505 | Rohm & Haas | 40% | Water | Emulsion |
| 1974 | Rohm & Haas | 42% | Water | Emulsion |
| WL 91 | Rohm & Haas | 41.5% | Water | Emulsion |
| 3907 | Spencer Kellogg | 75% | Propasol P/S-Butanol | Alkyd |
| AC 507 | Rohm & Haas | 46% | Water | Emulsion |
| 3922 | Spencer Kellogg | 80% | Propasol P/B Carbitol | Alkyd |
| 40-425 | Reichold | 65% | Butyl Cellosolve | Solution Acrylic |
| WR 748 | Rohm & Haas | 60% | Propasol/IPA | Solution Acrylic Oil-Modified |
| WR 98 | Rohm & Haas | 70% | IPA/Butyl-cell. | Solution Acrylic |
| 1615 | Rohm & Haas | 30% | Water | Acrylic thickener EW 218 |
| ASE 60 | Rohm & Haas | 28% | Water | Acrylic thickener EW 218 |
| ASE 75 | Rohm & Haas | 40% | Water | Acrylic thickener EW 266 |
| ASE 95 | Rohm & Haas | 20% | Water | Acrylic thickener EW 124 |
| ASE 108 | Rohm & Haas | 20% | Water | Acrylic thickener EW 124 |
| 940 | Goodrich | 100% | none | Polyacrylic acid EW 72 |
| Traga-canth | Madis | 100% | none | Natural gum |
| Guar | Madis | 100% | none | Natural gum |
| Locust bean | Madis | 100% | none | Natural gum |
| CMC 7H | Hercules | 100% | none | Carboxymethyl-cellulose |
| 250H | Hercules | 100% | none | Methyl Cellulose |
| MHPC | Hercules | 100% | none | Methylhydroxy-propylcellulose |
| MHEC | Hercules | 100% | none | Methylhydroxy-ethylcellulose |
| CMMC | Hercules | 100% | none | Carboxymethyl-methylcellulose |

Also in Table I, B. Carb. refers to Butyl Carbitol, while B. Cell, refers to Butyl Cellosolve, available from Union Carbide Co. Black Daniels is a pigment dispersion, and White Daniels is a pigment dispersion, both available from Daniels Products Co., Newark, N.J.

Procedures for the Preparation of Concentrate

The following procedure was used for all latex vehicles, i.e., Rohm & Haas resins 505, 1974, WL91 and 507.

EXAMPLE NO. 5.

To 70 grams of water, 3 grams of latex D1615, and 5 grams of Butylcellosolve were added. This mixture was allowed to stir for approximately 5 minutes. In a separate vessel, 20 grams of latex 505 and 2 grams of dibutylphthalate were mixed and then slowly added to the aqueous mixture previously prepared. The addition of the 505 thickened the solution because of the increase in alkalinity. The pH of the mixture was adjusted with 28% aqueous ammonium hydroxide to 9.2. The viscosity (after pH adjustment) was measured with a Brookfield viscosimeter RTV using a #7 spindle at 1 RPM. All asterisked* samples in Table I were measured using a #4 spindle, usually at 1 RPM, or at that speed which allowed a measurable reading.

If a pigment dispersion was used, the pigment dispersion was added to the latex vehicle and stirred until uniform.

All solution polymers such as Kelsol 3907 were made by the following procedure:

To 18.5 grams of Kelsol 3907, 3 grams of Rhoplex 1615 was slowly milled into solution using a spatula. Then 1.5 grams of triethylamine was slowly added and mixed until the mixture appeared homogeneous. To this mixture 77 grams of water was slowly blended in. The final mixture was adjusted with 25% aqueous ammonium hydroxide to a pH of 9.2

If a pigment dispersion was used, the pigment dispersion was added after neutralization of the polymers with triethylamine. At this stage, the mixture is extremely thick and simple stirring with a spatula was adequate.

Generally it was very easy to observe changes in viscosity on aerosolization where an acrylic thickener such as 1615 was used, since the relative change in viscosity on the addition of the propellant DME was very dramatic—going from a concentrate that was substantially a gel to a very fluid aerosol composition. It was also relatively easy to observe that little change in viscosity had occurred with the addition of propellant to highly viscous gums which had concentrate viscosities of 100 M cps. However, in the case of low viscosity gums such as locust bean gum, it was difficult to determine by observation whether the viscosity had been altered.

Procedure for the Preparation of Aerosols

Seventy (70) grams of the previously prepared concentrate were added to a Wheaton vinyl coated glass bottle. A Risdon 20 mm valve was then inserted and crimped into place with a #3000-C Adj. can crimper, and 30 grams of DME was transferred through the valve into the glass bottle. After shaking, observations were made as to the relative change in viscosity vs. the initial concentrate.

Spray testing procedures

In order to spray test each of the concentrates, Continental 202×509 aerosol cans were filled using a Precision valve having the following dimensions:

Housing orifice - 0.080×0.020 vapor tap

Stem - 2×0.020

Button - 0.016

As with the Wheaton bottles, 70 grams of concentrate and 30 grams of DME were used. After shaking and allowing to come to room temperature, the cans were tested for pressure, which was 65 psi. The cans were than sprayed on to a coated 8″×12″ test card which was held in a vertical position. The distance was 12 inches, and the duration of spray was for 3 seconds. The product either sprayed or streamed. If the product sprayed, observations were made on the vertical card as to whether the product had vertical cling. Any sign of product flow on the surface was recorded as "no vertical cling".

Various embodiments of this invention have been described with reference to aqueous film formers dispensed by aerosol means using propellant amounts of dimethyl ether, and the novel thickening system of this invention. As will be appreciated by those of ordinary skill in the art, a wide variety of active agents may be substituted for the film forming solids discussed above or, if desired, used in combination with film forming solids, and dispensed from aqueous dimethyl ether propelled aerosol compositions employing the novel thickening system of this invention. For example, an aqueous solution of alkali may be dispensed and used as an oven cleaner, employing the dimethyl ether propellant and thickening systems described herein.

While certain representative embodiments of the invention have been described for purposes of illustrating the invention, it will be apparent to those skilled in the art that various changes and modifications may be made therein without departing from the scope and spirit of the invention.

What is claimed is:

1. A propellant pressurized aerosol water based paint composition suitable for being sprayed from the valve of an aerosol dispenser, to provide a paint film capable of adhering to a vertically disposed substrate without running, comprising a water based paint concentrate under propellant pressure of dimethyl ether, wherein a portion of said dimethyl ether is dissolved in said concentrate, and said concentrate comprises water having at least one polymeric film former uniformly dispersed or dissolved therein, and said concentrate further includes at least one thickening agent which loses its ability to thicken said concentrate when said portion of dimethyl ether is dissolved in said concentrate, but regains its ability to thicken said concentrate upon dissolution of said dimethyl ether from said concentrate when said concentrate is sprayed from said aerosol dispener and applied as a film to a substrate.

2. The composition of claim 1 wherein said thickening agent is an acrylic thickening agent.

3. The composition of claim 1 wherein said thickening agent is a gum.

4. The composition according to claim 1 wherein said concentrate comprises an acrylic thickening agent, and an acrylic latex which includes said film forming component.

5. The composition according to claim 4 wherein said concentrate further includes a coalescing agent.

6. The composition according to claim 5 further includes a plasticizer.

7. The composition according to claim 1 wherein said film former is selected from the group consisting of acrylic polymers, alkyds or oil-modified alkyds.

8. The composition according to claim 1 wherein said concentrate has a viscosity of at least about 10,000 cps prior to having said portion of dimethyl ether dissolved therein.

9. The composition according to claim 3 wherein said gum is gum tragacanth.

10. The composition according to claim 4 wherein said concentrate prior to having said dimethyl ether dissolved therein has a viscosity of at least about 10,000 cps.

11. The composition according to claim 5 wherein said coalescing agent comprises about 0.5% to about 8% by weight of said concentrate.

12. The composition according to claim 1 wherein said film dries to a high gloss finish on said substrate.

13. A propellant pressurized aerosol water based paint composition suitable for being dispensed as a spray from an aerosol dispenser, comprising a water based paint concentrate under propellant pressure of dimethyl ether wherein a portion of said dimethyl ether is dissolved in said concentrate and wherein said concentrate comprises an acrylic film former and an aqueous emulsion of a polyacrylic thickening agent which loses its ability to thicken said concentrate when said portion of dimethyl ether is dissolved in said concentrate, but said thickening agent regains its ability to thicken said concentrate when said concentrate is sprayed from said aerosol dispenser and applied as a film to a substrate, and wherein said thickened film is capable of adhering to a vertically disposed substrate without running.

14. The composition according to claim 13 wherein prior to having said dimethyl ether dissolved therein said concentrate comprises by weight about 20% to about 95% water, about 3% to about 40% film forming solids from said acrylic film former, about 0.5% to about 10% by weight of said polyacrylic thickening solids having an equivalent weight of at least about 124, and wherein said concentrate further comprises about 0.1% to about 10% pigment solids.

15. The composition according to claim 14 wherein said concentrate further includes a coalescing agent, and wherein prior to having said portion of dimethyl ether dissolved therein said concentrate is thickened by said thickening agent to a viscosity of at least about 10,000 cps, and wherein upon solution of said portion of dimethyl ether in said concentrate, said concentrate becomes substantially water-thin.

16. The composition according to claim 14 wherein said concentrate further includes a plasticizer.

17. The composition according to claim 13 wherein said acrylic film former comprises an acrylic latex.

18. The composition according to claim 14 wherein said acrylic film former comprises an acrylic latex.

19. The composition according to claim 14 wherein said composition dries to a high gloss finish on said substrate.

* * * * *